United States Patent [19]

Kito et al.

[11] Patent Number: 4,607,205

[45] Date of Patent: Aug. 19, 1986

[54] METHOD AND SYSTEM FOR RECONNECTING INVERTER TO ROTATING MOTORS

[75] Inventors: Yasutami Kito, Haruhi; Kuniake Yasukawa, Gifu, both of Japan

[73] Assignee: Kabushiki Kaisha Meidensha, Tokyo, Japan

[21] Appl. No.: 661,309

[22] Filed: Oct. 16, 1984

[30] Foreign Application Priority Data

Oct. 18, 1983 [JP] Japan .............................. 58-194661

[51] Int. Cl.⁴ .......................................... H02P 1/26
[52] U.S. Cl. .................................. 318/778; 318/798; 318/806
[58] Field of Search ............... 318/778, 798, 805, 806, 318/807–811, 722, 723

[56] References Cited

U.S. PATENT DOCUMENTS

| | | | |
|---|---|---|---|
| 4,047,083 | 9/1977 | Plunkett | 318/807 |
| 4,371,823 | 2/1983 | Lohest | 318/723 |
| 4,409,533 | 10/1983 | Kawabata | 318/778 |
| 4,417,193 | 11/1983 | Hirata | 318/808 |
| 4,451,112 | 5/1984 | Hattori et al. | 318/778 |

*Primary Examiner*—David Smith, Jr.
*Attorney, Agent, or Firm*—Lowe, King, Price & Becker

[57] ABSTRACT

When an inverter is disconnected from a rotating motor due to power failure or motor accident, it is necessary to connect the inverter power again to the motor rotating by the inertia force in order to keep the motor rotating. To achieve the above reconnection, the inverter is controlled in accordance with the open-loop control method, without use of any motor speed detecting means, thus improving control response speed. In reconnection, the inverter is started at a frequency higher than the rotating motor speed and at a voltage lower than the rated value; only the frequency is decreased gradually but increased gradually again when the detected motor driving current reaches zero or the motor regenerated current starts flowing; and the voltage is raised when the detected motor regenerated current reaches its maximum value.

15 Claims, 2 Drawing Figures

METHOD AND SYSTEM FOR RECONNECTING INVERTER TO ROTATING MOTORS

BACKGROUND OF THE INVENTION

1. Field of the Invention

The present invention relates to a method and a system for reconnecting an inverter to rotating motors, and more particularly to a method and a system for connecting an inverter, which is now controlling induction motors at predetermined frequency and voltage, to the motors rotating due to the inertia force of the motor rotor, after the inverter has once been disconnected from the induction motors because of power failure or motor accident. In the method according to the present invention, the inverter is connected to rotating motors again in accordance with forward control method or open-loop control method, in place of feedback control method or closed-loop control method.

2. Description of the Prior Art

Induction motors are usually driven by an inverter. The inverter converts a DC power source rectified by a bridge-connected semiconductor rectifier and a capacitor into an AC power source suitable for driving the induction motors at predetermined frequency and torque. The rotational speed of an induction motor can effectively be controlled by the inverter in accordance with pulse width modulation method (described later).

In order to continuously drive the induction motor, a power supply equipment to protect against interruption of service is usually incorporated in the induction motor driving system including the inverter. In such a system as described above, in case commercial AC power source fails, power interruption is first detected by a power monitor relay and then the inverter is immediately disconnected from the induction motor in order to protect the inverter elements from being damaged by a surge of current applied from the motor to the inverter. Thereafter (after one or two seconds), the power supply equipment which protects against interruption is again connected to the motor driving system. Under these conditions, since the induction motor is still rotating due to the inertia force of the motor rotor, it is indispensable to synchronously reconnect the inverter to the induction motor. In other words, the inverter must be reconnected to the rotating motor while matching inverter frequency to motor speed or inverter phase to motor back electromotive force phase. Otherwise, a current surge will be generated by the motor and will damage the inverter elements, thus resulting in failure of reconnection between the inverter and the induction motor.

Further, there exists the situation where a plurality of parallel-connected induction motors are driven by a single inverter. In such a system as described above, in case one of the motors is connected to ground by accident (ground fault), a current surge discharged from the smoothing capacitor in the rectifier is sensed by a current transformer in order to immediately disconnect the inverter elements from the induction motors; that is, a circuit breaker arranged in the main circuit of induction motors is immediately opened. In this state, since power regenerated by the kinetic energy of the remaining normal induction motors is applied to the abnormal ground fault induction motor, a fuse arranged between the inverter and the abnormal motor is blown out to isolate the abnormal motor from the motor driving system. In response to the fuse melt signal, the inverter is restarted. Under these conditions, similarly, since the induction motor is still rotating due to the inertia force of the motor rotor, it is indispensable to close the circuit breaker arranged in the main circuit of the induction motors when the inverter is synchronized with the induction motors, that is, when inverter phase matches motor back electromotive force phase.

In the prior art system for reconnecting the inverter to rotating induction motors, a tachometer is conventionally attached on the induction motor side in order to detect the rotational speed of the induction motor. In more detail, motor rotational speed or motor back electromotive force phase is monitored by the tachometer; and when the monitored motor phase matches inverter phase, the inverter is reconnected to the induction motor. In other words, the reconnecting operation between the inverter and the induction motor is achieved in accordance with the feedback control method or closed-loop control method.

In the prior art system for reconnecting an inverter to a rotating induction motor, however, there exist the following drawbacks: (1) In the case of feedback control method depending upon a tachometer, control response speed is not high. In other words, it takes a relatively-long time to completely synchronize inverter phase with induction motor back electromotive force phase. (2) In use of a tachometer, an additional complicated circuit is necessary to distinguish the rotational directions (clockwise or counterclockwise) of the induction motor. (3) Since the tachometer must be connected to the induction motor independently from the system for reconnecting an inverter to an induction motor, this is rather troublesome to the users.

In this connection, there exists another system for reconnecting an inverter to a rotating synchronous motor, in place of an induction motor. In this case, the synchronization between the inverter and the synchronous motor can be achieved in accordance with the feedback control method by detecting back electromotive force generated from the synchronous motor rotating due to an inertia force of the motor rotor. However, since the time interval during which the back electromotive force is being generated is relatively short in the case of a synchronous motor and further since it is necessary to perfectly match the back electromotive force phase of the synchronous motor to inverter phase, it is rather difficult to stably reconnect the inverter to the rotating synchronous motor.

SUMMARY OF THE INVENTION

With these problems in mind, therefore, it is the primary object of the present invention to provide a method and system for reconnecting inverter power to rotating motors without the use of tachometers or without detecting motor speed, in other words, in accordance with the forward-control method or open-loop control method in order to enhance control response speed in the reconnecting operation.

The other object of the present invention is to provide a method and system for reconnecting inverter power to rotating motors, which is simple in system configuration and stable in reconnecting operation.

To achieve the above-mentioned object, the method of reconnecting an inverter to a rotating motor according to the present invention comprises the following steps of: (a) starting the inverter at a frequency higher than the rotational speed of the motor rotated by the inertia force of the rotor and at an output voltage lower than a rated value of the motor; (b) decreasing the inverter frequency gradually while keeping the inverter output voltage constant; (c) detecting polarity and change rate of inverter current supplied to or from the motor; (d) increasing the inverter frequency gradually when the detected polarity of the inverter current reaches a neutral point; (e) raising the inverter voltage abruptly to a predetermined value when the detected change rate of inverter current reaches zero and then increasing the inverter voltage gradually; and (f) controlling the motor speed steadily when ratio of inverter frequency to inverter voltage reaches a constant value.

To achieve the above-mentioned object, the system for reconnecting an inverter power to a rotating motor according to the present invention comprises: (a) shunt resistance means connected to the inverter for detecting motor driving current supplied from the inverter to the motor and motor regenerated current supplied from the motor to the inverter; (b) a comparator for comparing the detected motor driving current with a reference value and for outputting a regeneration start signal when the detected driving current reaches the reference value; (c) a differentiator for differentiating the detected motor regenerated current and for outputting a zero coefficient signal when differential coefficient of the detected motor regenerated current reaches zero; and (d) inverter gate control means for generating a sequence of inverter gate signals to supply power from the inverter to the motor at predetermined frequency and predetermined voltage in steady state, said control section being connected to said comparator and said differentiator for reconnecting said inverter to the rotating motor in transient state, after the inverter has been disconnected from the motor, in such a way that said control section starts the inverter at a frequency higher than the rotational speed of the motor rotated by the inertia force of the rotor and at an output voltage lower than the rated value of the motor; decreases the inverter frequency gradually while keeping the inverter output voltage constant; increases the inverter frequency gradually in response a regeneration start signal outputted from said comparator; raises the inverter voltage abruptly to a predetermined value in response to the zero coefficient signal outputted from said differentiator and then increasing the inverter voltage gradually; and controls the motor speed steadily when ratio of inverter frequency to inverter voltage reaches a constant value.

BRIEF DESCRIPTION OF THE DRAWINGS

The features and advantages of the method and system for reconnecting inverter power to a rotating motor according to the present invention over the prior art system will be more clearly appreciated from the following description taken in conjunction with the accompanying drawings in which.

DETAILED DESCRIPTION OF THE PREFERRED EMBODIMENT

In view of the above description, reference is now made to an embodiment of the system of reconnecting an inverter to a rotating motor according to the present invention.

Figure 1:
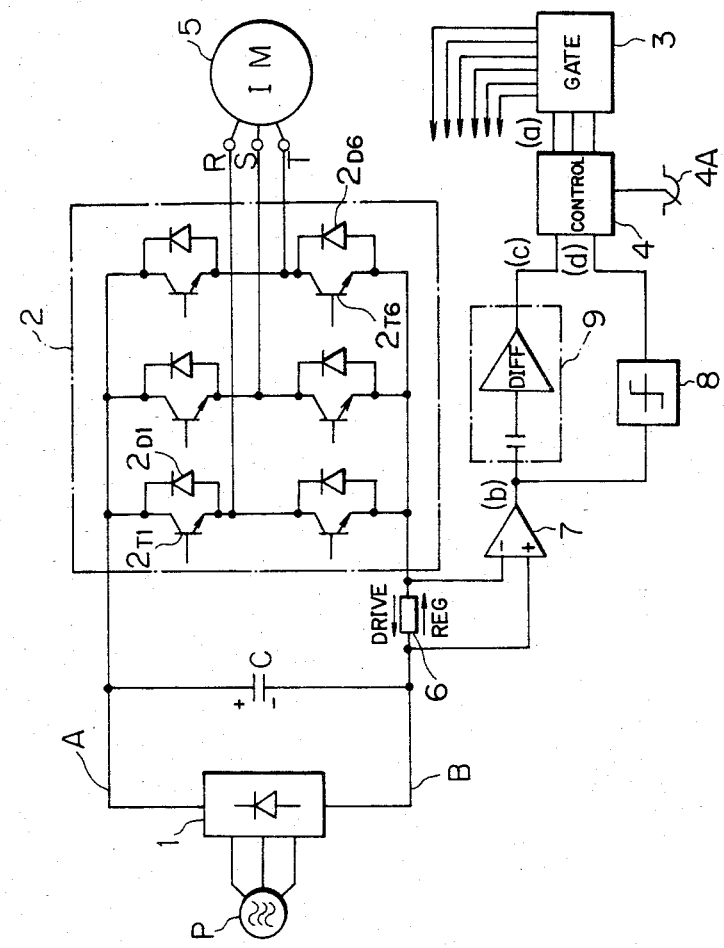
FIG. 1 is a schematic block diagram showing a motor driving system including an inverter and the system for reconnecting the inverter to a rotating motor according to the present invention.

FIG. 1 shows a motor driving section and the inverter reconnecting section together. The motor driving section is made up of a diode bridge-connected power rectifier (AC-DC converter) 1, a rectifying capacitor C, and a power inverter (DC-AC converter) 2 activated by an inverter gate unit 3, a gate control unit 4 and an motor speed presetting device 4A. The inverter reconnecting section for connecting the inverter 2 to an induction motor 5 is made up of a shunt resistance 6, an operational amplifier 7, a voltage comparator 8, and a differentiator 9.

The three-phase commercial AC power source P is first rectified by the diode power rectifier 1 and the rectifying capacitor C into a DC power source. The rectified DC power source is then converted, by the power inverter 2 controlled by the aid of the gate unit 3 and the gate control unit 4, into an AC power source having an appropriate frequency f and an appropriate voltage V both so determined as to drive the induction motor 5 at a predetermined speed and torque.

The power inverter 2 is made up of six bridge-connected switching semiconductor elements such as power transistors $2_{T1}$ to $2_{T6}$ and six regenerating diodes $2_{D1}$ to $2_{D6}$ connected each between the emitter and the collector of the transistor $2_T$. The switching power transistors $2_T$ are of course replaceable with other elements such as thyristors, gate-turn-off thyristors, etc.

In the power inverter 2, an inverter output having any desired pulse widths and pulse intervals can be obtained by appropriately applying input signals from the gate unit 3 to the base of each power transistor in sequence. In other words, it is possible to obtain any desired power source having different voltages and different frequencies by controlling inverter frequency and inverter voltage. In more detail, the inverter output power increases with increasing inverter gate frequency; the effective inverter voltage increases with increasing inverter gate pulse width or with decreasing inverter gate pulse interval. Further, in general, PWM (Pulse Width Modulation) control method is adopted in order to simultaneously control both the frequency and the voltage of the inverter power source, in which a triangular wave signal is compared with a a sine wave signed to determine each timing of the gate signals. The above-mentioned PWM method is implemented by the gate control unit 4.

The motor speed presetting device 4A such as a variable resistor serves to preset a desired inverter frequency in the form of a DC voltage level. In response to the DC voltage preset by the motor speed presetting device 4A, a voltage controlled oscillator (not shown) incorporated in the gate control unit 4 outputs an oscillation signal the frequency of which is proportional to the preset DC voltage. A triangular wave signal generator (not shown) also incorporated in the gate control unit 4 outputs a triangular-wave signal the frequency of which is an integer times higher than the frequency of the output signal of the voltage-controlled oscillator. In summary, it is possible to control the frequency and the effective voltage of the power inverter 2 by the aid of the gate control unit 4. In response to the output signals from the gate control unit 4, the gate unit 3 outputs a sequence of gate signals to the semiconductor elements of the power inverter 2.

In the reconnecting section, the shunt resistance 6 is connected in series with the power inverter 2 on the DC power source side and the operational amplifier 7 is connected across the shunt resistance 6 as shown in FIG. 1. The shunt resistance 6 serves to detect a small current proportional to a large current flowing between the DC power source and the power inverter 2. The operational amplifier 7 serves to detect the direction of the current flowing through the shunt resistance 6 in addition to the magnitude of the current flowing therethrough. The reason why it is necessary to detect the direction of the current flowing through the shunt resistance 6 is that in the system according to the present invention, the inverter frequency and the inverter voltage are both controlled in dependence upon the direction of the current flowing between the DC power source 1 and the power inverter 2, as described hereinbelow in more detail.

When the induction motor 5 is driven by the power inverter 2 (motor driving mode), the driving current flows from the terminal A of the diode rectifier 1 to the terminal B thereof by way of transistor $2_{T1}$, the terminal R of the motor 5, the terminal T thereof, the transistor $2_{T6}$ and the shunt resistance 6. Accordingly, the motor driving current flows through the shunt resistance 6 in the leftward direction as shown in FIG. 1.

In contrast with this, when the motor regenerates a power (motor regeneration mode), the regenerated current flows from the terminal R of the motor to the terminal T thereof by way of the regenerating diode $2_{D1}$, the positive terminal (+) of the capacitor C, the negative terminal (−) thereof, the shunt resistance 6, and the regenerating diode $2_{D6}$. Here, the regeneration means that when the inverter frequency is lower than motor frequency, the induction motor 5 functions as a generator connected to the power inverter. In this state, a motor kinetic energy is transduced into an electric power by the motor windings and is returned or restored to the DC power side from the rotating motor. Accordingly, the regenerated current flows through the shunt resistance 6 in the rightward direction as shown in FIG. 1.

Therefore, when the motor 5 is in driving mode, the shunt resistance 6 outputs a positive voltage, for instance, the level of which is roughly proportional to the driving current; when the motor 5 is in regeneration mode, the shunt resistance 6 outputs a negative voltage the level of which is roughly proportional to the regenerating current, both as depicted in FIG. 2(b).

Further, although the driving current or the regenerated current is a sinewave signal or a pulse signal, these signals are smoothed by the rectifying capacitor C into a roughly dc voltage level.

In this connection, it is also possible to use an ordinary amplifier in place of the operational amplifier. In this case, a kind of current transformer is connected in place of the shunt resistance 6. The primary winding of the current transformer is arranged near the conductor connected between the DC power source 1 and the power inverter 2, and a DC power source is connected to the secondary winding thereof in order to distinguish the direction of the current flowing through the primary winding of the current transformer.

Further, it is also possible to use other elements such as a Hall Effect element. This is because the Hall Effect element can also detect the magnitude and the direction of current flowing therethrough, simultaneously.

The operational amplifier 7 amplifies a voltage signal developed across the shunt resistance 6 and detects the polarity of the voltage signal. In response to the output signal from the operational amplifier 7, it is possible to detect motor driving mode or motor regeneration mode on the basis of the polarity of the output signal and further to detect the change rate in each mode of the basis of the change in voltage level of the output signal, as depicted in FIG. 2(b).

The voltage comparator 8 compares the output signal voltage of the operational amplifier 7 with a reference voltage (zero volt) and determines that the motor is operating in driving mode when the output voltage is beyond the reference voltage (positive) or that the motor is operating in regeneration mode when the output voltage is below the reference voltage (negative). As depicted in FIG. 2(d), the comparator 8 outputs a positive signal in motor driving mode and a negative signal in motor regeneration mode.

The differentiator 9 differentiates the output signal of the operational amplifier 7 and outputs a sharp pulse signal indicative of zero differential coefficient when the change rate of output voltage level of the amplifier 7 is zero, that is, the gradient of the output voltage level changes from negative to positive as depicted in FIGS. 2(b) and (c).

The gate control unit 4 controls the gate signals applied to the switching elements $2_{T1}$ to $2_{T6}$ of the power inverter 2 through the gate unit 3, in response to the output signals from the operational comparator 8 and the differentiator 9, in order to control the frequency and voltage of the power inverter 2 so that the power inverter can be connected to the rotating induction motor 5 stably into synchronized conditions.

The operation of the system for connecting an inverter power to a rotating induction motor according to the present invention will be described herein below with reference to the operation timing chart shown in FIG. 2.

When the rotating induction motor 5 is once disconnected from the power inverter 2 because of commercial power failure, for instance, and then connected again to the motor 5 while the motor 5 is still rotating, it is indispensable to synchronously reconnect the inverter 2 to the induction motor 5. In other words, it is necessary to apply an inverter voltage to the rotating motor 5 after inverting frequency or phase has matched motor frequency or phase. Otherwise, a rush current will be generated by the motor and thereby the inverter elements may be damaged.

Figure 2:
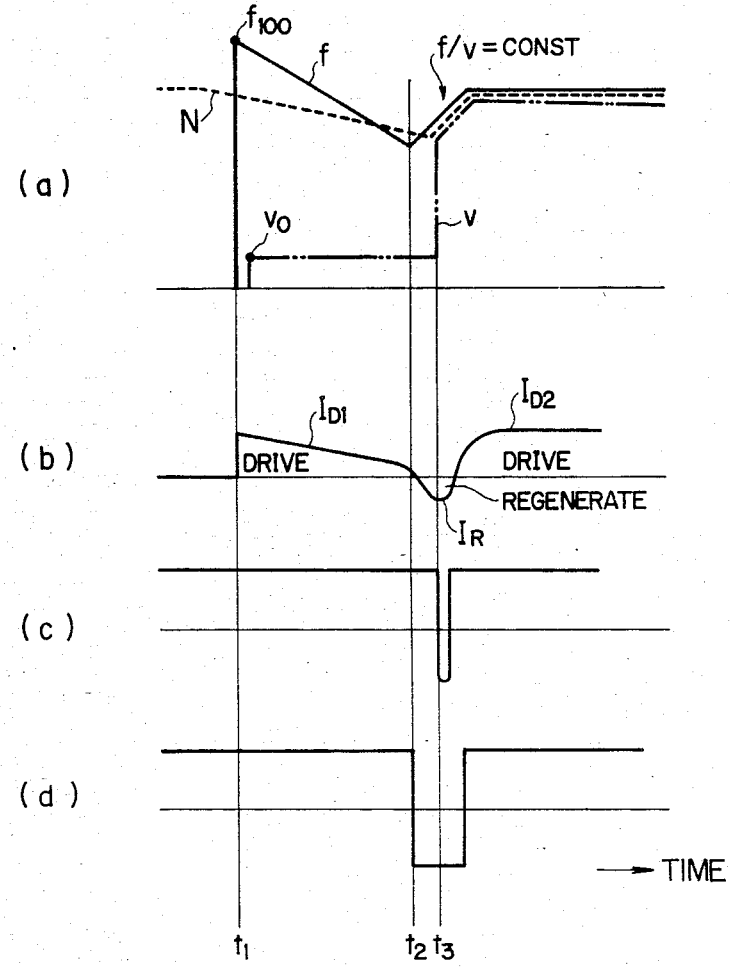
FIG. 2 is an operation timing chart of the system according to the present invention, in which (a) represents inverter frequency by solid lines, motor frequency or speed by dashed lines, and inverter voltage by dot-dot-dashed lines; (b) represents a voltage across a shunt resistance connected in series with the inverter to detect motor driving current supplied from the inverter to the motor and motor regenerated current supplied from the motor to the inverter; (c) represents a differentiated wave form of the voltage shown in (b); and (d) represents a signal obtained by comparing the voltage shown in (b) with a zero level.

To perfectly synchronize the inverter with the motor, the power inverter 2 is started by the gate control unit 4 in accordance with the following procedure: the gate control unit 4 outputs a sequence of gate signals for driving the inverter 2 at a frequency $f_{100}$ higher than the initial rotational speed N of the motor rotating due to an inertia force of the motor rotor or equal to the maximum rotational speed of the motor 5 and at a voltage $V_0$ lower than a voltage, which may pass a motor rated current, at time $t_1$ shown in FIG. 2.

This frequency $f_{100}$ can simply be determined so as to exceed the rotational speed N at the time when the motor is rotating in steady state. However, it is necessary to determine the voltage $V_0$ under consideration of various factors such as motor speed, motor rotor inertia, motor load, etc. In general, the voltage $V_0$ is determined so as to pass a current which is one-tenth (1/10) to one-fifth (1/5) times the motor rated current.

Then, the gate control unit 4 gradually decreases the inverter frequency f. Therefore, the motor driving current $I_{D1}$ supplied from the inverter 2 to the motor 5 decreases as the inverter frequency f approaches the motor speed N because the inverter voltage is held at a constant value $V_0$. The instance the inverter frequency f reaches the motor speed N, there still exists a motor driving current due to transient phenomena. However, after a small time has elapsed, the motor driving current $I_{D1}$ reaches zero at time $t_2$ as shown in FIG. 2(b). A decrease in this motor driving current is detected by the operational simplifier 7. When the inverter frequency is decreased below the motor speed, the motor operation is switched from motor driving mode to motor regeneration mode; that is, a motor kinetic energy is transduced into an electric power and returned to the power inverter 2. This switching point at which the motor driving current is zero is detected by the comparator 8 at time $t_2$ as shown in FIG. 2(d). In response to this comparator signal, the gate control section 4 starts to increase the power inverter frequency gradually, as shown in FIG. 2(a).

After time $t_2$, there still exists a motor regeneration mode for a short time period in spite of the fact that the inverter frequency exceeds the motor speed. However, since the regenerated current $I_R$ begins to decrease soon, the point at which the differential coefficient of the regenerated current $I_R$ is zero is detected by the differentiator 9 at time $t_3$ as shown in FIG. 2(c). In response to this zero differential coefficient signal, the gate control unit 4 abruptly increases the inverter voltage from $V_0$ to V. After time $t_3$, the inverter frequency and voltage are both increased gradually, so that the motor speed is gradually increased to the initial motor speed N. When the ratio (f/V) of inverter frequency to inverter voltage stays at a constant value, the motor speed is also kept at a constant value, at which the reconnecting operation is completed because the inverter frequency is completely synchronized with the motor frequency. Thereafter, the gate control unit 4 controls the inverter 2 so that the induction motor 5 rotates at a speed preset by the motor speed presetting device 4A. Under these conditions, the normal motor driving current $I_{D2}$ can be detected by the operational amplifier 7.

In summary, the method of reconnecting the inverter power to a rotating motor comprises the following steps of:

(a) starting the inverter at a frequency $f_{100}$ higher than the speed N of the rotating motor and at a voltage $V_0$ lower than the rated value of the motor;

(b) decreasing the inverter frequency gradually with the inverter output voltage $V_0$ constant;

(c) detecting the motor driving current $I_{D1}$;

(d) when the detected motor driving current $I_{D1}$ reaches zero, increasing the inverter frequency gradually;

(e) detecting the motor regenerated current $I_R$;

(f) when the detected motor regenerated current $I_R$ reaches its maximum value, increasing the inverter voltage abruptly from a low voltage $V_0$ to a high voltage V and then increasing the inverter voltage gradually until the ratio of inverter frequency to inverter voltage becomes constant.

Further, after time $t_3$, since the inverter frequency and voltage are increased simultaneously, there exist some cases where an excessive current is passed through the induction motor according to the magnitude of motor load. In such cases, it is preferable to previously determine the gradients of increase in inverter frequency and inverter voltage under consideration of motor inertia, motor load, etc. in order to prevent an excessive driving current from being passed through the inverter.

Further, in the case where motor load is very light, there exists the case where the motor is directly synchronized with the power inverter without having the motor regeneration mode. In such a case as described above, when the differential coefficient of the motor driving current is reversed at the point of inflection, the inverter frequency f is controlled so as to be held at a constant value and the inverter voltage is controlled so as to be increased gradually until the ratio (f/V) becomes a constant value, at which point the reconnecting operation is completed because the inverter frequency is completely synchronized with the motor frequency.

As described above, in the method and system of reconnecting an inverter to a motor or motors rotating due to the inertia force of the motor rotor according to the present invention, since the inverter power is reconnected to the rotating motor in accordance with open-loop control method, that is, in dependence upon motor driving current and motor regenerated current both detectable on the inverter side without use of any motor speed detecting means, it is possible to reconnect the inverter power to the rotating motor at a higher response speed and further to simplify the system configuration.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A method of reconnecting an inverter to a motor rotating due to an inertia force of a motor rotor after the inverter for steadily controlling motor speed has been disconnected from the motor, which comprises the following steps of:

(a) starting the inverter at a frequency higher than a rotational speed of the motor rotated by the inertia force of the rotor and at an output voltage lower than a rated value of the motor;

(b) decreasing the inverter frequency gradually while keeping the inverter output voltage constant;

(c) detecting polarity and change rate of inverter current supplied to or from the motor;

(d) increasing the inverter frequency gradually when the detected polarity of the inverter current reaches a neutral point;

(e) raising the inverter voltage abruptly to a predetermined value when the detected change rate of inverter current reaches zero and then increasing the inverter voltage gradually; and (f) controlling the motor speed steadily when ratio of inverter frequency to inverter voltage reaches a constant value.

2. A method of reconnecting an inverter to a motor rotating due to an inertia force of a motor rotor after the inverter for steadily controlling motor speed has been disconnected from the motor, which comprises the following steps of:
(a) starting the inverter at a frequency higher than a rotational speed of the motor rotated by the inertia force of the rotor and at an output voltage lower than a rated value of the motor;
(b) decreasing the inverter frequency gradually while keeping the inverter output voltage constant;
(c) detecting motor driving current supplied from the inverter to the motor and motor regenerated current supplied from the motor to the inverter;
(d) increasing the inverter frequency gradually when the detected motor driving current reaches zero or motor regenerated current starts to flow from the motor to the inverter;
(e) raising the inverter voltage abruptly to a predetermined value when the detected motor regenerated current reaches its maximum value and then increasing the inverter voltage gradually; and
(f) controlling the motor speed steadily when ratio of inverter frequency to inverter voltage reaches a constant value.

3. The method of reconnecting an inverter to a motor as set forth in claim 2, wherein in step (a), the output voltage preset when starting the inverter is one-tenth to one-fifth times the rated value of the motor.

4. The method of reconnecting an inverter to a motor as set forth in claim 2, wherein in step (d), the rate of increasing the inverter frequency gradually is determined according to magnitude of motor load including the motor rotor inertia.

5. The method of reconnecting an inverter to a motor as set forth in claim 2, wherein in step (e), the rate of increasing the inverter voltage is determined according to magnitude of motor load including the motor rotor inertia.

6. The method of reconnecting an inverter to a motor as set forth in claim 2, wherein in steps (d) and (e), in the case where no motor regenerated current is produced because of a light motor load, keeping the inverter frequency at a constant value and increasing the inverter voltage gradually when the motor driving current supplied from the inverter to the motor reaches its minimum value.

7. A system for reconnecting an inverter to a motor rotating due to an inertia force of a motor rotor after the inverter for steadily controlling motor speed at predetermined frequency and voltage has been disconnected from the motor, which comprises:
(a) shunt resistance means connected to the inverter for detecting motor driving current supplied from the inverter to the motor and motor regenerated current supplied from the motor to the inverter;
(b) a comparator for comparing the detected motor driving current with a reference value and for outputting a regeneration start signal when the detected driving current reaches the reference value;
(c) a differentiator for differentiating the detected motor regenerated current and for outputting a zero coefficient signal when differential coefficient of the detected motor regenerated current reaches zero; and
(d) inverter gate control means for generating a sequence of inverter gate signals to supply power from the inverter to the motor at predetermined frequency and predetermined voltage in steady state, said control section being connected to said comparator and said differentiator for reconnecting said inverter to the rotating motor in transient state, after the inverter has been disconnected from the motor, in such a way that said control section starts the inverter at a frequency higher than a rotational speed of the motor rotated by the inertia force of the rotor and at an output voltage lower than a rated value of the motor; decreases the inverter frequency gradually while keeping the inverter output voltage constant; increases the inverter frequency gradually in response to the regeneration start signal outputted from said comparator; raises the inverter voltage abruptly to a predetermined value in response to the zero coefficient signal outputted from said differentiator and then increasing the inverter voltage gradually; and controls the motor speed steadily when ratio of inverter frequency to inverter voltage reaches a constant value.

8. The system for reconnecting an inverter to a motor as set forth in claim 7, wherein the inverter output voltage preset when starting the inverter in transient state is one-tenth to one-fifth times the rated value of the motor.

9. The system for reconnecting an inverter to a motor as set forth in claim 7, wherein the rate of increasing the inverter frequency gradually in response to the regeneration start signal outputted from said comparator is determined according to magnitude of motor load including the motor rotor inertia.

10. The system for reconnecting an inverter to a motor as set forth in claim 7, wherein the rate of increasing the inverter voltage gradually in response to the zero coefficient signal outputted from said differentiator is determined according to magnitude of motor load including the motor rotor inertia.

11. The system for reconnecting an inverter to a motor as set forth in claim 7, wherein in the case where no motor regenerated current is produced because of a light motor load, said inverter gate control means keeps the inverter frequency at a constant value and simultaneously increases the inverter voltage gradually in response to the zero coefficient signal outputted from said differentiator.

12. The system for reconnecting an inverter to a motor as set forth in claim 7, wherein the reference voltage preset in said comparator is zero volt.

13. The system for reconnecting an inverter to a motor as set forth in claim 7, wherein said shunt resistance means comprises:
(a) a shunt resistor connected to the inverter; and
(b) an operational amplifier connected to said shunt resistor.

14. The system for reconnecting an inverter to a motor as set forth in claim 7, wherein said shunt resistance means is a current transformer including a DC power source in a secondary winding thereof.

15. The system for reconnecting an inverter to a motor as set forth in claim 7, wherein said shunt resistance means is a Hall effect element.

* * * * *